United States Patent [19]

Myers et al.

[11] Patent Number: 4,676,318
[45] Date of Patent: Jun. 30, 1987

[54] METHOD OF REDUCING PERMEABILITY IN SUBTERRANEAN FORMATION BY USE OF ALKALI METAL SILICATE FOAM

[75] Inventors: Ronald D. Myers, Calgary, Canada; Frans Greebe, Branchburg, N.J.

[73] Assignee: Exxon Production Research Company, Houston, Tex.

[21] Appl. No.: 936,564

[22] Filed: Dec. 1, 1986

[51] Int. Cl.$^4$ ...................... E21B 33/138; E21B 43/24
[52] U.S. Cl. ..................................... 166/293; 166/292; 166/300; 166/303; 166/309
[58] Field of Search ........ 166/270, 272, 288, 292–294, 166/300, 303, 309

[56] References Cited

U.S. PATENT DOCUMENTS

| 2,402,588 | 6/1946 | Andresen . | |
|---|---|---|---|
| 3,285,338 | 11/1966 | Boston | 166/292 X |
| 3,379,260 | 4/1968 | O'Brien | 166/292 X |
| 3,412,794 | 11/1968 | Craighead | 166/303 X |
| 3,455,392 | 7/1969 | Prats | 166/303 |
| 3,464,491 | 9/1969 | Froning | 166/294 X |
| 3,645,336 | 2/1972 | Young et al. | 166/288 |
| 3,664,425 | 5/1972 | Penberthy et al. | 166/303 |
| 3,805,893 | 4/1974 | Sarem | 166/270 |
| 3,861,469 | 1/1975 | Bayless et al. | 166/303 |
| 3,965,986 | 6/1976 | Christopher | 166/292 |
| 4,004,639 | 1/1977 | Sandiford | 166/292 |
| 4,109,722 | 8/1978 | Widmyer et al. | 166/303 X |
| 4,147,211 | 4/1979 | Sandiford | 166/292 X |
| 4,301,867 | 11/1981 | Sydansk et al. | 166/292 |
| 4,445,573 | 5/1984 | McCaleb | 166/309 X |
| 4,548,270 | 10/1985 | Eilers | 166/291 |

Primary Examiner—George A. Suchfield
Attorney, Agent, or Firm—Jeffrey M. Hoster

[57] ABSTRACT

A method of reducing the permeability of an area of a subterranean formation is disclosed. An alkali metal silicate foam is produced by injecting into the formation a solution of alkali metal silicate and a chemical surfactant, and a non-condensible gas. The foam hardens into a substantially impermeable solid. The foam may be used to reduce permeability in areas of the formation which have been steam swept during steam stimulation cycles. Thus, subsequent steam stimulation cycles will be directed to uncontacted areas of the formation.

17 Claims, No Drawings

METHOD OF REDUCING PERMEABILITY IN SUBTERRANEAN FORMATION BY USE OF ALKALI METAL SILICATE FOAM

BACKGROUND OF THE INVENTION

1. Field of the Invention

This invention relates to a method for reducing permeability of a subterranean formation, primarily for use in steam stimulation recovery techniques. More particularly, this invention relates to a method of blocking an area of a subterranean formation by use of a rigid, impermeable foam including alkali metal silicates.

2. Description of the Prior Art

Steam stimulation recovery techniques are widely used to increase production from an oil bearing formation. In steam stimulation techniques, steam is used to heat the section of a formation adjacent to a wellbore so that production rates are increased through lowered oil viscosities and the corresponding reduced resistance to flow through the injected area.

In a typical conventional steam stimulation injection cycle, steam is injected into the desired section of a reservoir. A shut-in or "soak" phase may follow, in which thermal energy diffuses through the formation. A production phase follows in which oil is produced until oil production rates decrease to an uneconomical amount. Subsequent injection cycles are often used to increase recovery.

Steam stimulation techniques recover oil at rates as high as 80-85% of the original oil in place in zones in which the steam contacts the reservoir. However, there are problems in contacting all zones of a reservoir due to heterogeneities in the reservoir such as high/low permeability streaks, which may cause gravity override, and steam fingering. When any of these heterogeneities are present in a reservoir, the efficiency of the process begins to deteriorate due to reduced reservoir pressure, reservoir reheating, longer production cycles, and reduced oil-steam ratios. As a result, steam stimulation may become unprofitable.

Various methods have been proposed so that steam can be diverted to uncontacted zones of a reservoir. One such method is disclosed in U.S. Pat. No. 2,402,588 to Andresen ("Andresen"). Andresen discloses a method of sealing a more permeable area of a reservoir by injecting into a reservoir a dilute alkaline solution of sodium silicate under low pressure. An acid gas such as carbon dioxide is then injected to reduce the alkalinity of the solution, resulting in gelling.

Another such method is disclosed in U.S. Pat. No. 3,645,336 to Young et al. ("Young"). Young discloses the plugging of a zone of a reservoir by injecting a mixture of steam and sodium silicate into the permeable zone. A second mixture containing steam and a gelling agent such as carbon dioxide is injected in the permeable zone, and the two mixtures are allowed to react. A hard silica gel plug is formed.

Another such method is disclosed in U.S. Pat. No. 3,805,893 to Sarem ("Sarem"). Sarem discloses the formation of a gelatinous precipitate by injection of small slugs of a dilute aqueous alkaline metal silicate solution, followed by water and then a dilute aqueous solution of a water soluble material which reacts with the alkali metal silicate to form a precipitate. The precipitate hardens to form a substantially impermeable substance.

Another such method is disclosed in U.S. Pat. No. 3,965,986 to Christopher ("Christopher"). In Christopher, a slug of fumed colloidal silica and water is injected into a reservoir. This slug has a relatively low viscosity. A surfactant is then injected which forms a gel on contact with the silica slug.

In each of the above methods, a relatively impermeable gel can be formed. However, each method requires a large volume of silicate to form a gel with sufficient surface area to ensure that the resulting gel contacts the entire area desired to be blocked.

It is an object of the present invention to provide an improved method of reducing permeability in selected areas of a subterranean formation. It is a further object of the present invention to provide an improved method of reducing permeability in depleted areas of a hydrocarbon bearing reservoir for more effective steam stimulation operations.

SUMMARY OF THE INVENTION

To increase oil recovery in steam stimulation techniques, steam may be diverted from selected areas of an oil bearing formation by injecting into the formation a solution including alkali metal silicate and a cationic chemical surfactant ("silicate solution"). Non-condensible gas is then injected into the reservoir to contact the silicate solution, forming a large volume of foam. Permeability of the depleted area of a hydrocarbon bearing reservoir within the formation is reduced by the foam after it hardens into a rigid, substantially impermeable solid. Subsequent injections of steam will be diverted into areas of the reservoir in which permeability has not been reduced.

DESCRIPTION OF THE PREFERRED EMBODIMENT

In a preferred embodiment, at least one, and usually three or four conventional steam stimulation cycles are completed. After three or four steam stimulation cycles, the efficiency of the process begins to deteriorate. Steam continues to preferentially contact reservoir areas which were previously swept by steam. At this point, steam diversion becomes desirable to ensure further productive stimulation.

A solution is injected into the steam swept zones which includes an alkali metal silicate, preferably sodium silicate, and one or more cationic chemical surfactants ("silicate solution"). The volume of silicate solution injected depends on the area of the reservoir requiring permeability reduction and on the magnitude of the reservoir heterogeneity. For example, if the heterogeneity has been identified as a local high permeability streak or fracture, the volume of solution required may only be 100 to 200 m$^3$. However, if there is generally high permeability in the steam swept zone, volumes of up to 1,000 m$^3$ may be required. As the volume of solution used should be determined following evaluation of the reservoir, the aforementioned volumes should not be considered limits, but estimates of the average volume required.

The solution may be injected via the wells by which steam was injected. More than one well may be used for injection in order to plug a communication channel. The solution will preferably contact the zones of the formation which have been previously swept by steam, as resistance to flow is lowest in these zones.

The silicate in the solution should be between 2 percent and 5 percent of the solution weight. Commercially available silicate solutions include silicon dioxide and disodium oxide. The ratio of moles of silicon dioxide to moles of disodium oxide can vary from 1:1 to 1:4. The ratio in a typical commercial solution is 1:3.22. The solution is most effective when the solution includes 0.001 to 0.005 moles of cationic surfactant per mole of sodium silicate.

The solution should also contain a catalyst to initiate gel formation. This catalyst should be a weak acid such as ammonium sulfate in an amount from 0.5 to 0.6 moles of catalyst per mole of disodium oxide.

Before the solution begins to form a gel, a volume of non-condensible gas is injected into the formation. The gas causes the chemical surfactant and silicate solution to produce a foam. Depending on the amount and rate of gas injected, the produced foam will have a volume of 5 to 10 times the volume of gel resulting from the solution alone. The gas may be injected via the wells by which the solution is injected. The gas is preferably injected in a quantity of 1000–2000 m$^3$ per m$^3$ of surfactant. The gas should be injected at a pressure sufficient to force penetration of the silicate foam to the desired depth in the formation prior to hardening of the foam. Following injection of the gas, fresh water may be injected into the formation to ensure that the area around the wellbore is clean so that subsequent steam stimulation cycles may be conducted.

In some uses, the gas may be injected from a location separate from the injection location of the silicate solution. For example, it may be desired to inject the gas and silicate solution simultaneously, requiring injection from multiple wells.

The foam will harden into a substantially impermeable solid. Following solidification of the foam, steam stimulation cycles can resume. The steam from subsequent steam injection cycles will be diverted to areas of the formation which have not been previously contacted by steam. Thus, additional areas of the reservoir will have lowered oil viscosities and reduced resistance to flow.

The design process described above contains variables which may be changed to fit a particular reservoir structure. The type and quantity of surfactant, type and quantity of gas, pH of the solution, the volume of sodium silicate solution, the concentration of silicate in the solution, the pressure at which the gas is injected, and the type of initiation may be varied.

The non-condensible gas may be chosen from a variety of gases such as nitrogen, methane, or field gas. Field gas is preferred for most embodiments, as the need to bring gas to the well site is eliminated.

The type of surfactant used is also an important variable. Tetra-alkyl ammonium salts, such as trimethyldecyl ammonium chloride, are one preferred class of effective surfactants. Cationic surfactants are generally preferred because of superior foaming when contacting non-condensible gas and silicate solutions.

While not wishing to be bound by theory, it appears that catonic surfactants such as tetra-alkyl ammonium chloride chemically react with silicate monomers resulting in the formation of high foaming, long chain quaternary alkyl ammonium silicates. When anionic and nonionic surfactants are used, the same high degree of foam formation is not observed.

The pH of the solution will also vary depending on how deep into the reservoir the solution must penetrate and how large a volume of foam is desired. Silicate solutions designed to foam and gel in a pH range of 9.5 to 11 generally produce a high quality and stable foam. Also, an alkaline solution will temporarily retard the gelling process, thereby allowing the solution to be pumped deep into the formation before the foam hardens. A weak acid such as ammonium sulfate, should be present in the solution as a catalyst. The amount or strength of the acid can be increased if faster solidification is required.

The concentration of silicate in the solution will also vary. The silicate solution may be injected in a series of slugs with each slug followed by an injection of gas. It may be desired to increase the concentration with successive slugs to increase the strength of the foam nearest the wellbore, or to inject the desired volume of silicate solution and gas, with a subsequent injection of a quantity of solution with a higher concentration of silicate. The foam in the near wellbore area would have sufficient strength to withstand the high injection pressure of subsequent steam stimulation cycles.

Following the hardening of the foam, conventional steam stimulation cycles can be resumed. Because of the reduced permeability in the previously contacted area, the steam will be directed to an uncontacted area. Thus, additional oil can be produced from the reservoir due to lowered viscosity and reduced resistance to flow.

The results of a laboratory experiment show how a typical foam may be created. 0.1 liter of a sodium silicate solution including 5 percent by weight silicate (0.0345 moles of disodium oxide and 0.115 moles of silicon dioxide) were mixed with 0.1351 grams (0.000575 moles) of trimethyldecyl ammonium chloride. 0.0207 liters of a 1 molar solution of ammonium sulfate were added and the solution was whipped for one minute. A stable foam having a volume of approximately six times the volume of the reactants resulted. The foam hardened in approximately two hours.

The principle of the invention and the best mode contemplated for applying that principle have been described. It is understood that the foregoing is illustrative only and that other means and techniques can be employed without departing from the true scope of the invention defined in the following claims.

We claim:

1. A method of reducing permeability in an area of a subterranean formation, comprising the steps of:
   injecting into the subterranean formation a solution comprising alkali metal silicate and a chemical surfactant in an amount sufficient to produce a volume of foam capable of reducing permeability in the desired formation area;
   injecting into the formation prior to solidification of said solution a non-condensible gas in an amount sufficient to contact substantially the entire quantity of said sodium silicate solution so that said non-condensible gas reacts with said solution to produce a foam; and
   permitting the foam to harden to a substantially impermeable solid.

2. The method of claim 1 wherein said chemical surfactant is a cationic surfactant.

3. The method of claim 1 wherein said non-condensible gas is field gas.

4. The method of claim 1 wherein said non-condensible gas is nitrogen.

5. The method of claim 1 further comprising the step of injecting into the formation a slug of water following said injection of the non-condensible gas.

6. The method of claim 1 wherein said silicate is sodium silicate.

7. The method of claim 6 where the ratio of said chemical surfactant to sodium silicate in said solution is 0.001 moles to 0.005 moles of surfactant per mole sodium silicate.

8. The method of claim 1 wherein said solution further comprises a catalyst.

9. The method of claim 8 where said catalyst is ammonium sulfate.

10. The method of claim 1 wherein said non-condensible gas is injected in a quantity of 1000 to 2000 $m^3$ per $m^3$ of chemical surfactant.

11. The method of claim 1 wherein said chemical surfactant is a tetra-alkyl ammonium salt.

12. The method of claim 1 wherein said solution has a pH of between 9.5 and 11.

13. A method of reducing permeability in an area of a subterranean formation, comprising the steps of:
  injecting into the subterranean formation a slug of solution comprising alkali metal silicate and a chemical surfactant;
  injecting into the formation prior to solidification of said solution a slug of non-condensible gas in an amount sufficient to contact substantially the entire quantity of said sodium silicate to produce a foam; and
  sequentially repeating the injection of said slug of solution and said slug of non-condensible gas until a volume of foam is produced which is capable of reducing permeability in the desired formation area.

14. The method of claim 13 further comprising the step of injecting a quantity of water following each slug of non-condensible gas.

15. The method of claim 13 wherein each successive slug of solution contains an increasing concentration of alkali metal silicate.

16. The method of claim 13 wherein said non-condensible gas is injected into the formation simultaneously with the injection of said silicate solution, said non-condensible gas having an injection location separate from the injection location of said silicate solution.

17. A method of recovering oil from a subterranean formation, comprising the steps of:
  producing oil from an area of said formation by completing at least one steam stimulation cycle;
  reducing the permeability of the area of subterranean formation contacted by said at least one steam stimulation cycle by injecting into the subterranean formation a solution comprising alkali metal silicate and a chemical surfactant in an amount sufficient to produce a volume of foam capable of reducing permeability in the desired formation area, injecting into the formation prior to solidification of said solution a non-condensible gas in an amount sufficient to contact substantially the entire quantity of said sodium silicate solution so that said non-condensible gas reacts with said solution to produce a foam, and permitting the foam to harden to a substantially impermeable solid; and
  producing oil from an area of said formation not contacted by said at least one steam stimulation cycle by completing at least one additional steam stimulation cycle.

* * * * *